(12) United States Patent
Sundaravel Damotharan et al.

(10) Patent No.: US 12,152,517 B2
(45) Date of Patent: Nov. 26, 2024

(54) SYSTEMS AND METHODS FOR COMPENSATING NOx SENSOR MEASUREMENTS TO MEET SUFFICIENCY REQUIREMENTS

(71) Applicant: Cummins Inc., Columbus, IN (US)

(72) Inventors: Arun Shori Sundaravel Damotharan, Columbus, IN (US); Rutika Kaustubh Gokhale, Columbus, IN (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 18/281,049

(22) PCT Filed: Mar. 10, 2022

(86) PCT No.: PCT/US2022/019829
§ 371 (c)(1),
(2) Date: Sep. 8, 2023

(87) PCT Pub. No.: WO2022/192589
PCT Pub. Date: Sep. 15, 2022

(65) Prior Publication Data
US 2024/0151175 A1    May 9, 2024

Related U.S. Application Data

(60) Provisional application No. 63/159,605, filed on Mar. 11, 2021.

(51) Int. Cl.
*F01N 11/00* (2006.01)
*B01D 53/94* (2006.01)
*F01N 3/20* (2006.01)

(52) U.S. Cl.
CPC ........ *F01N 11/007* (2013.01); *B01D 53/9418* (2013.01); *B01D 53/9495* (2013.01);
(Continued)

(58) Field of Classification Search
CPC ...... F01N 3/208; F01N 3/2066; F01N 3/0842; F01N 3/0885; F01N 11/007;
(Continued)

(56) References Cited

U.S. PATENT DOCUMENTS 6,145,305 A * 11/2000 Itou ..................... B01D 53/9495
60/276
8,091,338 B2 * 1/2012 Yokoyama ............ F02D 41/027
60/278
(Continued)

FOREIGN PATENT DOCUMENTS

WO    WO-2019/209161 A1    10/2019

OTHER PUBLICATIONS

International Search Report and Written Opinion for International Application No. PCT/US2022/019829 mailing date Jun. 9, 2022, 8 pages.

*Primary Examiner* — Dapinder Singh
(74) *Attorney, Agent, or Firm* — Foley & Lardner LLP

(57) ABSTRACT

Systems and methods for diagnosing an exhaust aftertreatment system and mitigating the effects of a potential fault in the exhaust aftertreatment system are provided. A method includes: receiving, by a controller, data indicative of an amount of at least one of a gain or an offset affecting a sensor in an aftertreatment system; determining, by the controller, a compensation value based on the amount of the at least one of the gain or the offset; receiving, by the controller, data indicative of an amount of an exhaust gas constituent in the aftertreatment system; applying, by the controller, the determined compensation value to the data indicative of the amount of the exhaust gas constituent in the aftertreatment system to create compensated data; and initiating, by the controller, an action based on the compensated data.

20 Claims, 11 Drawing Sheets

(52) U.S. Cl.
CPC ........ *F01N 3/208* (2013.01); *B01D 2257/404* (2013.01); *F01N 2550/02* (2013.01); *F01N 2900/0408* (2013.01); *F01N 2900/1402* (2013.01)

(58) Field of Classification Search
CPC ..... F01N 2900/0408; F01N 2900/1402; F01N 2900/1614; F01N 2550/00; F01N 2550/02; F01N 2560/026; F01N 2560/12; F01N 2560/02; F01N 2560/00; F01N 2570/14; B01D 53/9418; B01D 53/9495; B01D 2257/404; Y02T 10/12; Y02T 10/40
See application file for complete search history.

(56) References Cited

U.S. PATENT DOCUMENTS

| | | | |
|---|---|---|---|
| 9,890,685 B2* | 2/2018 | Jang | F01N 3/2066 |
| 2012/0303206 A1 | 11/2012 | Rajagopalan et al. | |
| 2016/0186630 A1 | 6/2016 | Osburn et al. | |
| 2018/0112572 A1 | 4/2018 | Nakano et al. | |
| 2020/0063633 A1 | 2/2020 | Lauritano et al. | |
| 2021/0148265 A1* | 5/2021 | Lundberg | F01N 11/00 |

* cited by examiner

SYSTEMS AND METHODS FOR COMPENSATING NOx SENSOR MEASUREMENTS TO MEET SUFFICIENCY REQUIREMENTS

CROSS-REFERENCE TO RELATED APPLICATION

This application claims priority to and the benefit of U.S. Provisional Patent Application No. 63/159,605 filed Mar. 11, 2021 and titled "SYSTEMS AND METHODS FOR COMPENSATING NOX SENSOR MEASUREMENTS TO MEET SUFFICIENCY REQUIREMENTS," which is incorporated herein by reference in its entirety.

TECHNICAL FIELD

The present disclosure relates to diagnosing exhaust aftertreatment systems. More particularly, the present disclosure relates to detection of malfunctions of a selective catalytic reduction (SCR) system of an exhaust aftertreatment system via a nitrous oxide (NOx) sensor.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants.

SUMMARY

One embodiment relates to a system for diagnosing an exhaust aftertreatment system and mitigating the effects of a potential fault in the exhaust aftertreatment system. The system includes a sensor structured to provide exhaust gas constituent information, and one or more processing circuits comprising one or more memory devices coupled to one or more processors, the one or more memory devices configured to store instructions thereon that, when executed by the one or more processors, cause the one or more processors to: receive information indicative of an amount of at least one of a gain or an offset affecting the sensor, determine a compensation value based on the amount of the at least one of the gain or the offset, receive the exhaust gas constituent information from the sensor, apply the determined compensation value to the exhaust gas constituent information to create compensated information, and initiate an action based on the compensated information.

Another embodiment relates to a method for diagnosing an exhaust aftertreatment system and mitigating the effects of a potential fault in the exhaust aftertreatment system. The method includes: receiving, by a controller, data indicative of an amount of at least one of a gain or an offset affecting a sensor in an aftertreatment system; determining, by the controller, a compensation value based on the amount of the at least one of the gain or the offset; receiving, by the controller, data indicative of an amount of an exhaust gas constituent in the aftertreatment system; applying, by the controller, the determined compensation value to the data indicative of the amount of the exhaust gas constituent in the aftertreatment system to create compensated data; and initiating, by the controller, an action based on the compensated data.

Still another embodiment relates to a system for diagnosing an exhaust aftertreatment system and mitigating the effects of a potential fault in the exhaust aftertreatment system. The system includes a selective catalytic reduction (SCR) system, a sensor structured to provide exhaust gas constituent information regarding exhaust gas, and a controller configured to: receive the exhaust gas constituent information from the sensor, determine compensated information by applying at least one of a compensation offset value or a compensation gain value to the exhaust gas constituent information, and initiate an action based on the compensated information.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
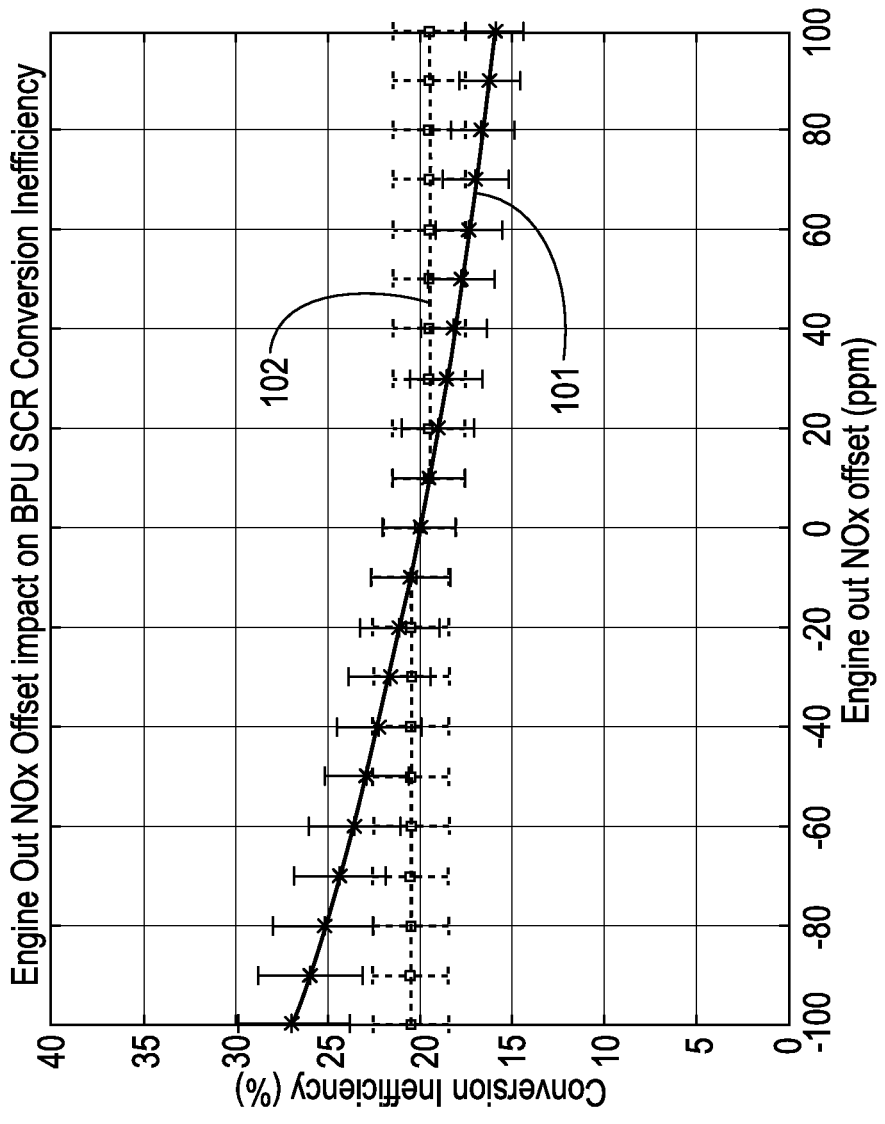
FIG. 1 is a plot of values of an estimated SCR inefficiency as a function of offset affecting measurements or readings from an engine-out NOx sensor, according to an exemplary embodiment.

Following below are more detailed descriptions of various concepts related to, and implementations of, methods, apparatuses, and systems for improving detection of malfunctioning SCR systems by compensating for offset and/or gain in NOx sensor outputs (also referred to herein as readings or measurements). Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As environmental regulations become more stringent, consistent aftertreatment system performance is especially important in order to keep vehicle emissions within compliance. Consistent aftertreatment system performance is dependent on components of the aftertreatment system functioning correctly, so detecting when aftertreatment system components are malfunctioning (or functioning outside of acceptable bounds) may be an important function. One such aftertreatment system component is the Selective Catalytic Reduction (SCR) system, which converts nitrous oxides (NOx) in the exhaust stream into less harmful nitrogen and water. SCR health can be determined based on a conversion efficiency, which refers to how efficiently the SCR is converting NOx to less harmful elements. One way to determine SCR conversion efficiency is to compare a SCR NOx inlet value to a SCR NOx outlet value. In turn, SCR conversion efficiency determinations may rely on sensed values from one or more NOx sensors. As such, determining whether the SCR system is functioning properly may be dependent on the health/operation capability of the NOx sensor.

Sensors are inherently affected by offset and/or gain. Offset refers to a flat value that the sensed value is off from the actual value (e.g., an offset of 10° C. means that an actual temperature of 60° C. would be read as 70° C.), while gain refers to a percentage amount that the sensed value is off from the actual value (e.g., a gain of 10% or 1.1 means that an actual temperature of 60° C. would be read as 66° C.). Because offset and gain are generally unavoidable for sensors, some amount of offset and/or gain is allowed to be present without an error flag being raised for the sensor at-issue.

However, for the NOx sensor, certain amounts of offset or gain can negatively impact the NOx sensor's ability to diagnose the SCR system (or, be used by a controller to diagnose the SCR system). For example, as NOx sensor offset goes further negative than −15 ppm (parts-per-million), the NOx sensor may not be able to properly identify that an SCR is malfunctioning, even if the SCR is, in fact, malfunctioning. This issue is exacerbated for Best Performance Unacceptable (BPU) SCRs, which are SCRs that convert NOx at a technically unacceptable rate but only barely so (i.e., the best performance that is possible while still being unacceptable). Because these SCRs are close to being acceptably efficient, detecting that the SCRs are malfunctioning takes higher levels of precision and sensitivity, which becomes a greater issue at certain levels of offset/gain.

This type of error is referred to as a Type II error, or a "false negative," and can be especially problematic when the goal is to identify negatives (e.g., detecting malfunctioning SCR) because a Type II error is a direct failure to identify negatives. Here, for example, when the detection process for malfunctioning SCRs is affected by Type II errors, then there will be instances in which the SCR is allowed to continue malfunctioning without the user being notified, leading to extended periods of non-compliance with emissions regulations. As such, reducing the number of Type II errors without otherwise affecting the underlying system operation or without increasing the number of Type I errors (i.e., "False Positives") would be advantageous.

Referring to the figures generally, the various embodiments disclosed herein relate to systems, apparatuses, and methods for improving detection of malfunctioning SCR systems by compensating for offset and/or gain in NOx sensor outputs. By compensating for offset/gain affecting one or more NOx sensors, the SCR-diagnostic capabilities of the NOx sensors are improved without or likely without affecting the system as a whole. As described, the systems and methods herein receive raw data indicative of an amount of gain and/or offset affecting the one or more NOx sensors, transform the raw data into an amount of compensation for the NOx sensors outputs, and then apply the compensation based on priority logic. By transforming the raw data into practicable output, the systems and methods herein are employing the raw data towards a practical application: detecting SCR malfunction.

Furthermore, the systems and methods described herein fundamentally transform NOx sensor functionality by addressing a 'gap' that impairs the NOx sensor's ability to detect SCR malfunctions. As discussed, the detection of a malfunctioning SCR relies on an engine-out NOx sensor and a system-out NOx sensor, but if one or more of these NOx sensors are experiencing certain amounts of offset and/or gain, the NOx sensors are unable to detect a malfunction in the SCR even if the SCR is, in fact, malfunctioning (i.e., Type II error). This issue is generally addressed by setting a fault flag if the offset/gain reaches an error threshold value. However, there are certain values of offset/gain that are enough to affect the NOx sensor's ability to diagnose SCR malfunctions but are not enough to trigger a NOx sensor fault flag. These certain values for offset/gain are referred to as the NOx gap. By compensating for the offset/gain experienced by the NOx sensors in this NOx gap, the systems and methods herein 'shrink' the NOx gap, reducing the frequency of Type II errors. The systems and methods described herein directly target the offset/gain that causes the NOx gap and reduce the number of Type II errors without a corresponding increase in Type I errors.

FIGS. 1-4 illustrate plots of values for a determined SCR catalyst inefficiency based on sensor offset/gain according to traditional methods and to the systems and methods described herein. For each of FIGS. 1-4, the values for the plots are based on simulations (rather than field-testing) according to an amount of engine-out NOx with a mean value of 400 ppm and a standard deviation of 50 ppm (i.e., 400±50 ppm), and an SCR conversion inefficiency with a mean value of 20% and a standard deviation of 2% (i.e., 20±2%). SCR conversion inefficiency is calculated according to an amount of system-out NOx (SONOx) divided by an amount of engine-out NOx (EONOx), such that the conversion inefficiency is an indication of how much of the NOx output by the engine is not converted (or reduced) by the aftertreatment system.

FIG. 1 is a plot 100 of values of estimated SCR inefficiency as a function of offset affecting measurements or readings of an engine-out NOx sensor. An x-axis of the plot 100 is an amount of engine-out NOx sensor offset in units of ppm, and a y-axis of the plot 100 is a conversion inefficiency of the SCR catalyst, determined based on the engine-out NOx sensor and given in units of percentage. Line 101 plots values for determined SCR conversion inefficiency based on the engine-out sensor utilizing traditional methods, and line 102 plots values for determined SCR conversion inefficiency based on the engine-out sensor utilizing the systems and methods described herein. As shown, line 101 overestimates the SCR conversion inefficiency for low offset (i.e., negative values) and underestimates the SCR conversion inefficiency for high offset (i.e., positive values). This is due to a low offset for EONOx leading to traditional methods determining SCR conversion inefficiency based on a much smaller value for EONOx, which shrinks the denominator of the SCR conversion inefficiency calculation and increases the resultant determination. Furthermore, a high offset for EONOx leads to traditional methods determining SCR conversion inefficiency based on a much larger value for EONOx, which increases the denominator of the SCR conversion inefficiency calculation and decreases the resultant determination. In contrast, the systems and methods described herein compensate for the offset (either high or low), leading to determined SCR conversion inefficiencies that more closely align with a predefined desired range, which as described herein, is 20±2%.

Figure 2:
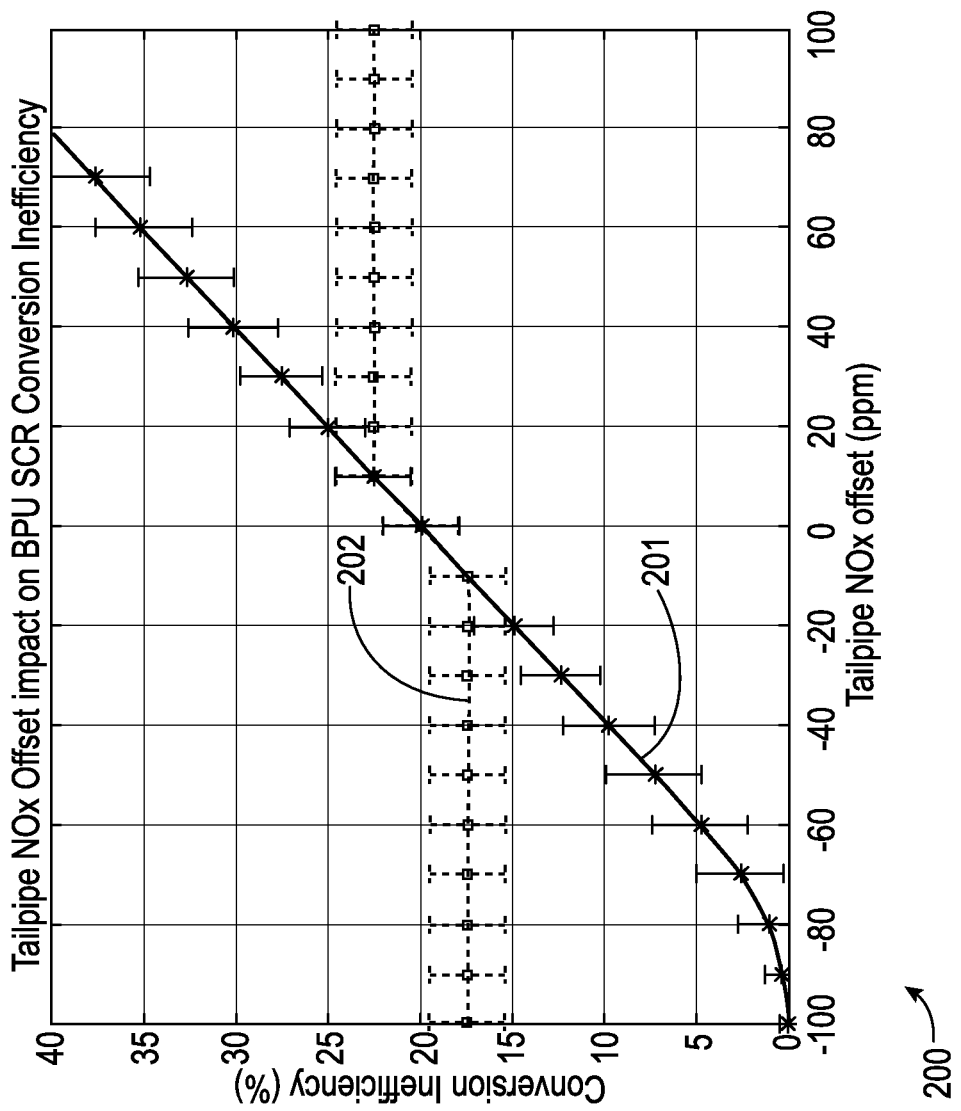
FIG. 2 is a plot of values of an estimated SCR inefficiency as a function of offset affecting measurements or readings from a tailpipe NOx sensor, according to an exemplary embodiment.

FIG. 2 is a plot 200 of values of estimated SCR inefficiency as a function of offset affecting measurements or readings of a tailpipe NOx sensor, according to an exemplary embodiment. An x-axis of the plot 200 is an amount of tailpipe NOx sensor offset in units of ppm, and a y-axis of the plot 200 is a conversion inefficiency of the SCR catalyst, determined based on the tailpipe NOx sensor and given in units of percentage. Line 201 plots values for determined SCR conversion inefficiency based on the tailpipe sensor utilizing traditional methods, and line 202 plots values for determined SCR conversion inefficiency based on the tailpipe sensor utilizing the systems and methods described herein. As shown, line 201 underestimates the SCR conversion inefficiency for low offset (i.e., negative values) and overestimates the SCR conversion inefficiency for high offset (i.e., positive values). This is due to a low offset for SONOx leading to traditional methods determining SCR conversion inefficiency based on a much smaller value for SONOx, which shrinks the numerator of the SCR conversion inefficiency calculation and decreases the resultant determination. Furthermore, a high offset for SONOx leads to traditional methods determining SCR conversion inefficiency based on a much larger value for SONOx, which increases the numerator of the SCR conversion inefficiency calculation and increases the resultant determination. In contrast, the systems and methods described herein compensate for the offset (either high or low), leading to determined SCR conversion inefficiencies that more closely align with 20±2%.

Figure 3:
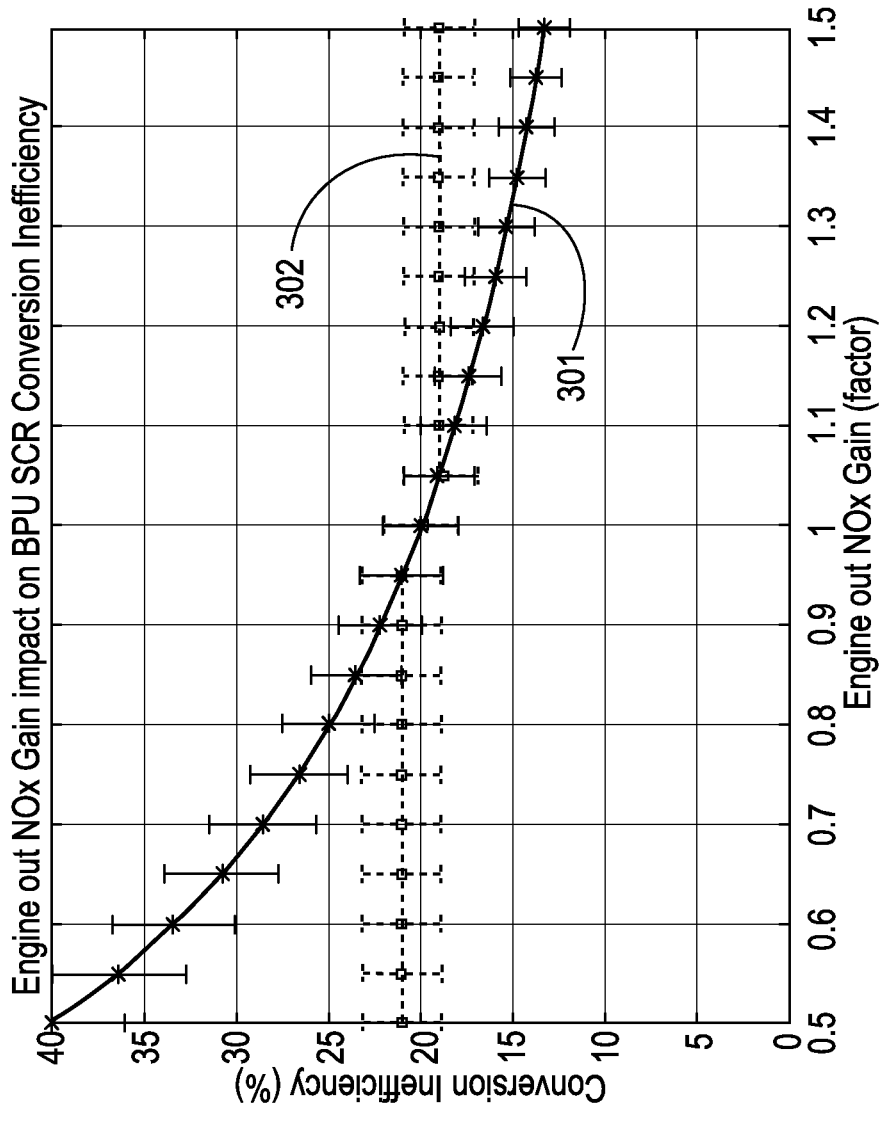
FIG. 3 is a plot of values of an estimated SCR inefficiency as a function of gain affecting measurements or readings from an engine-out NOx sensor, according to an exemplary embodiment.

FIG. 3 is a plot 300 of values of estimated SCR inefficiency as a function of gain affecting measurements or readings of an engine-out NOx sensor, according to an exemplary embodiment. An x-axis of the plot 300 is an amount of engine-out NOx sensor gain in units of factor, and a y-axis of the plot 300 is a conversion inefficiency of the SCR catalyst, determined based on the engine-out NOx sensor and given in units of percentage. Line 301 plots values for determined SCR conversion inefficiency based on the engine-out sensor utilizing traditional methods, and line 302 plots values for determined SCR conversion inefficiency based on the engine-out sensor utilizing the systems and methods described herein. As shown, line 301 overestimates the SCR conversion inefficiency for low gain (i.e., factor less than 1) and underestimates the SCR conversion inefficiency for high gain (i.e., factor greater than 1). This is due to a low gain for EONOx leading to traditional methods determining SCR conversion inefficiency based on a much smaller value for EONOx, which shrinks the denominator of the SCR conversion inefficiency calculation and increases the resultant determination. Furthermore, a high gain for EONOx leads to traditional methods determining SCR conversion inefficiency based on a much larger value for EONOx, which increases the denominator of the SCR conversion inefficiency calculation and decreases the resultant determination. Because the effect of gain (either low or high) is proportionate to the affected value, the over/underestimation for traditional methods is more greatly affected by gain than for gain, such that the slope of line 301 is steeper than that of line 101. In contrast, the systems and methods described herein compensate for the gain (either high or low), leading to determined SCR conversion inefficiencies that more closely align with 20±2%.

Figure 4:
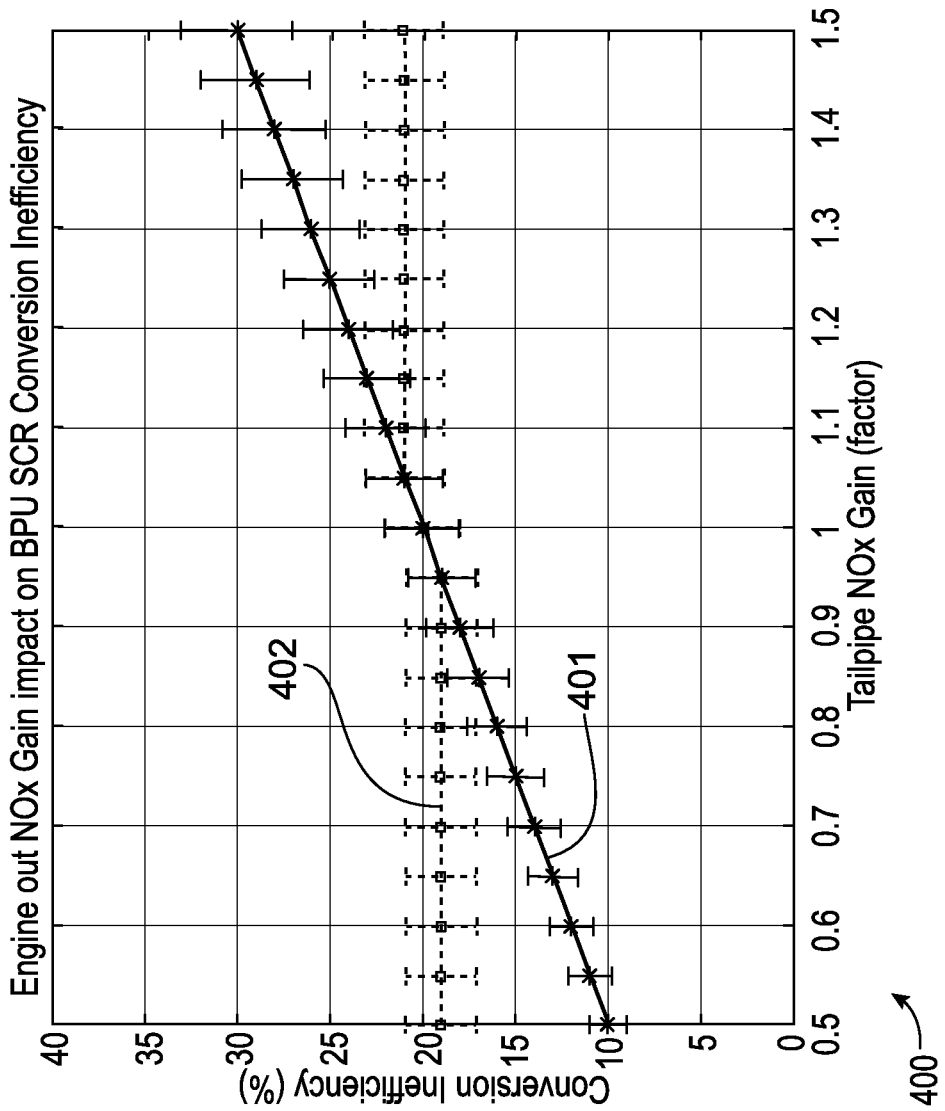
FIG. 4 is a plot of values of an estimated SCR inefficiency as a function of gain affecting measurements or readings from a tailpipe NOx sensor, according to an exemplary embodiment.

FIG. 4 is a plot 400 of values of estimated SCR inefficiency as a function of gain affecting measurements or readings of a tailpipe NOx sensor, according to an exemplary embodiment. An x-axis of the plot 400 is an amount of tailpipe NOx sensor gain in units of ppm, and a y-axis of the plot 400 is a conversion inefficiency of the SCR catalyst, determined based on the tailpipe NOx sensor and given in units of percentage. Line 401 plots values for determined SCR conversion inefficiency based on the tailpipe sensor utilizing traditional methods, and line 402 plots values for determined SCR conversion inefficiency based on the tailpipe sensor utilizing the systems and methods described herein. As shown, line 401 underestimates the SCR conversion inefficiency for low gain (i.e., negative values) and overestimates the SCR conversion inefficiency for high gain (i.e., positive values). This is due to a low gain for SONOx leading to traditional methods determining SCR conversion inefficiency based on a much smaller value for SONOx, which shrinks the numerator of the SCR conversion inefficiency calculation and decreases the resultant determination. Furthermore, a high gain for SONOx leads to traditional methods determining SCR conversion inefficiency based on a much larger value for SONOx, which increases the numerator of the SCR conversion inefficiency calculation and increases the resultant determination. In contrast, the systems and methods described herein compensate for the gain (either high or low), leading to determined SCR conversion inefficiencies that more closely align with 20±2%.

Figure 5:
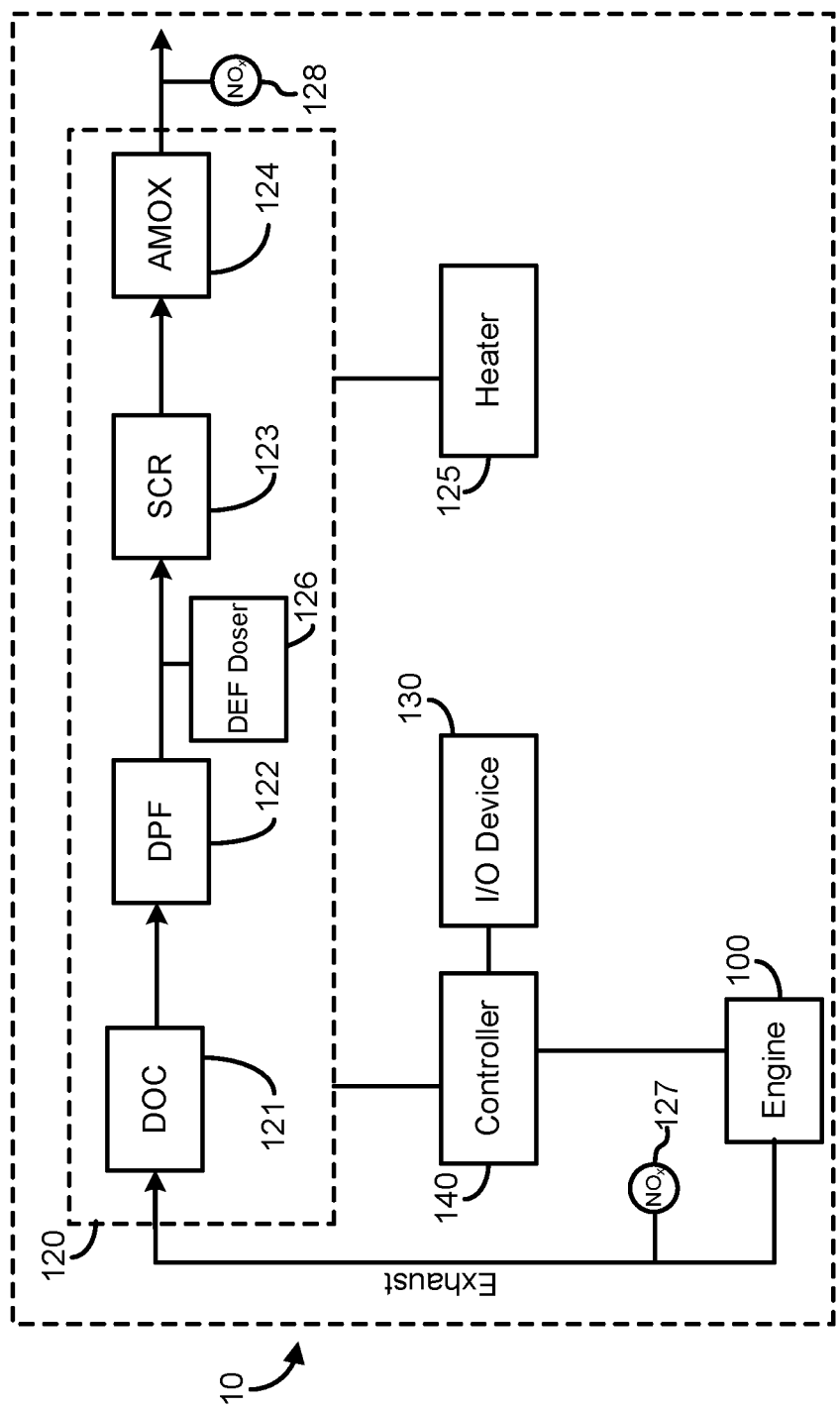
FIG. 5 is a schematic diagram of a system with a controller, according to an exemplary embodiment.

Referring now to FIG. 5, a vehicle 10 with a controller 140 that actively transforms information from a sensor, such as a NOx sensor, to diagnose an aftertreatment system or component thereof is shown, according to an example embodiment. As shown, the vehicle 10 includes an engine 100, an aftertreatment system 120, an operator input/output (I/O) device 130, and a controller 140. The vehicle 10 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, locomotives, marine vehicles, aviation vehicles, and other types of vehicles. In another embodiment, the vehicle 10 a stationary piece of equipment, such as a power generator or genset. Thus, the present disclosure is applicable with a wide variety of implementations.

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 140 is communicably coupled to the systems and components in the vehicle 10, the vehicle controller 140 is structured to acquire operation data and/or OBD capability data regarding one or more of the components or systems shown in FIG. 5. For example, the operation data may include data regarding operating conditions of the powertrain 100 acquired by one or more sensors, such as an engine-out NOx sensor 127 and a system-out NOx sensor 128.

The engine 100 may be any type of internal combustion engine that generates exhaust gas (e.g., compression ignition or a spark ignition engine that may utilize various fuels, such as natural gas, gasoline, diesel fuel, jet fuel, etc.). In another embodiment, the vehicle is an at least partially hybrid vehicle where power from the internal combustion engine may be replaced by and/or supplemented with an electric motor. In either configuration, the engine 100 includes one or more cylinders and associated pistons. In this regard, air from the atmosphere is combined with fuel, and combusted, to power the engine 100. Combustion of the fuel and air in combustion chambers of the engine 100 produces exhaust gas that is operatively vented to an exhaust pipe and to the aftertreatment system 120. In the example shown, the engine 100 is structured as an internal combustion engine and particularly, a compression-ignition engine powered by diesel fuel.

The aftertreatment system 120 is in exhaust-gas receiving communication with the engine 100. The aftertreatment system includes a diesel particulate filter (DPF) 122, a diesel oxidation catalyst (DOC) 121, a selective catalytic reduction (SCR) system 123, an ammonia oxidation catalyst (AMOX) 124, a heater 125, and a DEF doser 126. The DOC 121 is structured to receive the exhaust gas from the engine 100 and to oxidize hydrocarbons and carbon monoxide in the exhaust gas, among its other functions such as NO oxidation to NO2 to promote passive DPF regeneration and fast SCR reaction. The DPF 122 is arranged or positioned downstream of the DOC 121 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some implementations, the DPF 122 may be omitted.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR catalyst member by the DEF doser 126 such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 120. The aftertreatment system 120 may further include an oxidation catalyst (e.g. the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the HC conversion efficiency of the DOC 121 exceeds a predefined threshold (e.g. the conversion of HC to less harmful compounds, which is known as the HC conversion efficiency).

The SCR 123 is configured to reduce or at least assist in the reduction of NOx emissions by accelerating a NOx reduction process between the DEF from the DEF doser 126 and the NOx of the exhaust gas into diatomic nitrogen, water, and/or carbon dioxide. If the SCR catalyst member is not at or above a certain temperature, the acceleration of the NOx reduction process is limited and the SCR 123 may not be operating at a necessary level of efficiency to meet regulations. In some embodiments, this certain temperature is approximately 250-300° C. The SCR catalyst member may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). In some embodiments, the AMOX 124 is included with the aftertreatment system 120 and is structured to address ammonia slip by removing excess ammonia from the treated exhaust gas before the treated exhaust is released into the atmosphere.

Because the aftertreatment system 120 treats the exhaust gas before the exhaust gas is released into the atmosphere, some of the particulate matter or chemicals that are treated or removed from the exhaust gas may build up in the aftertreatment system over time. For example, the soot filtered out from the exhaust gas by the DPF 122 may build up on the DPF 122 over time. Similarly, sulfur particles present in fuel may accumulate in the SCR 123 and deteriorate the effectiveness of the SCR catalyst member. Further, DEF that undergoes incomplete thermolysis upstream of the catalyst may build up and form deposits on downstream components of the aftertreatment system 120. However, these build-ups on (and subsequent deterioration of effectiveness of) these components of the aftertreatment system 120 may be reversible. In other words, the soot, sulfur, and DEF deposits may be substantially removed from the DPF 122 and the SCR 123 by increasing a temperature of the exhaust gas running through the aftertreatment system to recover performance (e.g. for the SCR, conversion efficiency of NOx to $N_2$ and other compounds). These removal processes are referred to as regeneration events and may be performed for the DPF 122, SCR 123, or another component in the aftertreatment system 120 on which deposits develop.

However, exposure to high temperatures during active regenerations degrades the DOC, DPF, and SCR catalysts. An active regeneration event is specifically commanded, such as a flow rate measurement through a DPF being below a predefined threshold indicating a partially blocked DPF which, in turn, causes the controller to command a regeneration event where exhaust gas temperatures are elevated in order to raise the temperature of the DPF and burn off the accumulated PM and other components (e.g., raise engine power output, post-injection, and other means to increase exhaust gas temperatures to cause a regeneration event). In contrast, a passive regeneration event occurs naturally during operation of the vehicle (e.g., a high load condition that may be experience while traversing a hill causes an increase in exhaust gas temperatures and regeneration event occurs naturally—not specifically commanded).

In some embodiments, the heater 125 is located in the exhaust flow path before the aftertreatment system 120 and is structured to controllably heat the exhaust gas upstream of the aftertreatment system 120. In some embodiments, the heater 125 is located directly before the DOC 121, while in other embodiments, the heater 125 is located directly before the SCR 123 or is located directly before the AMOX 124. The heater 125 may be any sort of external heat source that can be structured to increase the temperature of passing exhaust gas, which, in turn, increases the temperature of components in the aftertreatment system 120, such as the DOC 121 or the SCR 123. As such, the heater may be an electric heater, a grid heater, a heater within the SCR 123, an induction heater, a microwave, or a fuel-burning (e.g., HC fuel) heater. As shown here, the heater 125 is an electric heater that draws power from the energy storage device 109. The heater 125 may be controlled by the controller 140 during an active regeneration event in order to heat the exhaust gas (e.g., by convection). Alternatively, the heater may be positioned proximate a desired component to heat the component (e.g., DPF) by conduction (and possibly convection). Multiple heaters may be used with the exhaust aftertreatment system, and each may be structured the same or differently (e.g., conduction, convection, etc.).

Referring still to FIG. 5, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 5 or determinations (described below) of the controller 140. The operator I/O device 130 enables an operator of the vehicle 100 to communicate with the controller 140 and one or more components of the vehicle 100 of FIG. 5. For example, the operator I/O device 130 may include, but is not limited to, an interactive display, a touchscreen device, one or more buttons and switches, voice command receivers, etc.

Figure 6:
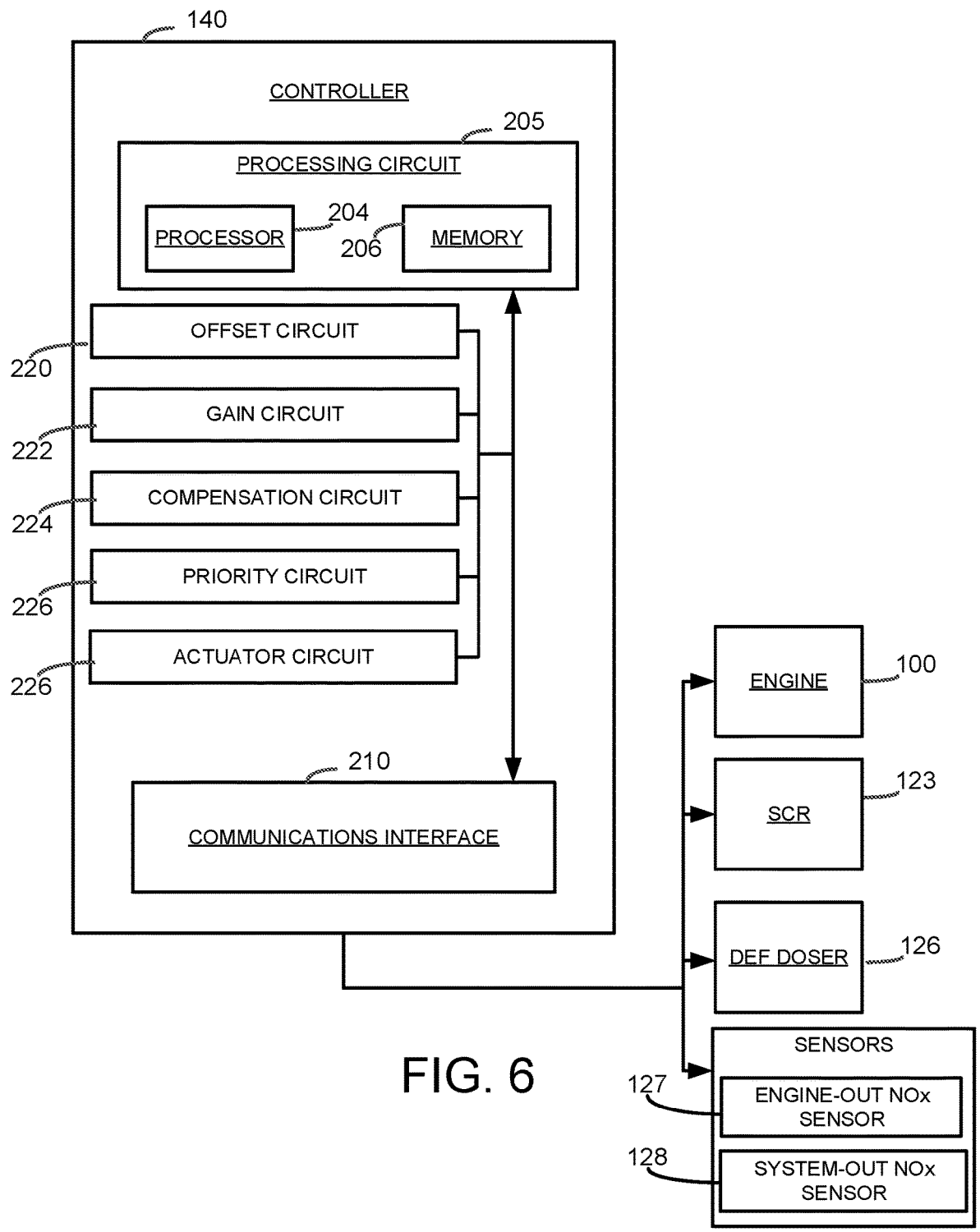
FIG. 6 is a schematic diagram of the controller of the system of FIG. 5, according to an exemplary embodiment.

Briefly referencing FIG. 6, as also shown, one or more sensors are included in the aftertreatment system 120. The sensors are coupled to the controller 140, such that the controller 140 can monitor and acquire data indicative of operation of the vehicle 10. In this regard, the sensor array includes at least the engine-out NOx sensor 127 and the system-out NOx sensor 128. The engine-out NOx sensor 127 is positioned in the exhaust flow immediately downstream of the engine 100, and acquires data indicative of a NOx amount at or approximately at its disposed location. The system-out NOx sensor 128 is positioned in the exhaust flow immediately downstream of the aftertreatment system 120, and acquires data indicative of a NOx amount at or approximately at its disposed location. It should be understood that the depicted locations, numbers, and type of sensors is illustrative only. In other embodiments, different/additional sensors may also be included with the vehicle 10 (e.g., a pressure sensor, a flow rate sensor, a temperature sensor, etc.). Those of ordinary skill in the art will appreciate and recognize the high configurability of the sensors in the vehicle 10.

As the components of FIG. 5 are shown to be embodied in the vehicle 10, the controller 140 may be structured as one or more electronic control units (ECU). The function and structure of the controller 140 is described in greater detail in FIG. 6.

Referring now to FIG. 6, a schematic diagram of the controller 140 of the vehicle 10 of FIG. 5 is shown according to an example embodiment. As shown in FIG. 6, the controller 140 includes a processing circuit 205 having a processor 204 and a memory 206, an offset circuit 220, a gain circuit 222, a compensation circuit 224, a priority circuit 226, and an actuator circuit 228, and a communications interface 210. The controller 140 is structured to receive data indicative of offset or gain affecting one or more NOx sensors from one or more virtual sensors, transform the data into a compensation value for the one or more real sensors, and then take action based on applying this compensation to the output from the one or more real sensors. In particular, the controller 140 may apply the compensation to the system-out NOx sensor 128 in order to reduce the possibility of a type II error when diagnosing an SCR 123 malfunction by reducing the 'NOx gap.' In addition, while reference is made primarily to the controller 140 determining compensation values for one or more NOx sensors to diagnose the SCR 123, the systems and methods described herein should be read as applicable to any exhaust gas constituent (e.g., soot, sulfur oxide, hydrocarbons, etc.) and corresponding sensors (e.g., pressure sensors, flow sensors, etc.)

In one configuration, the offset circuit 220, the gain circuit 222, the compensation circuit 224, the priority circuit 226, and the actuator circuit 228 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the offset circuit 220, the gain circuit 222, the compensation circuit 224, the priority circuit 226, and the actuator circuit 228 are embodied as hardware units, such as electronic control units. As such, the offset circuit 220, the gain circuit 222, the compensation circuit 224, the priority circuit 226, and the actuator circuit 228 may be embodied as one or more circuitry components including, but not limited to, processing circuitry, network interfaces, peripheral devices, input devices, output devices, sensors, etc. In some embodiments, the offset circuit 220, the gain circuit 222, the compensation circuit 224, the priority circuit 226, and the actuator circuit 228 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the offset circuit 220, the gain circuit 222, the compensation circuit 224, the priority circuit 226, and the actuator circuit 228 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The offset circuit 220, the gain circuit 222, the compensation circuit 224, the priority circuit 226, and the actuator circuit 228 may also include programmable hardware devices such as field programmable gate arrays, programmable array logic, programmable logic devices or the like. The offset circuit 220, the gain circuit 222, the compensation circuit 224, the priority circuit 226, and the actuator circuit 228 may include one or more memory devices for storing instructions that are executable by the processor(s) of the offset circuit 220, the gain circuit 222, the compensation circuit 224, the priority circuit 226, and the actuator circuit 228. The one or more memory devices and processor(s) may have the same definition as provided below with respect to the memory 206 and processor 204. In some hardware unit configurations, the offset circuit 220, the gain circuit 222, the compensation circuit 224, the priority circuit 226, and the actuator circuit 228 may be geographically dispersed throughout separate locations in the vehicle. Alternatively and as shown, the offset circuit 220, the gain circuit 222, the compensation circuit 224, the priority circuit 226, and the actuator circuit 228 may be embodied in or within a single unit/housing, which is shown as the controller 140.

In the example shown, the controller 140 includes the processing circuit 205 having the processor 204 and the memory 206. The processing circuit 205 may be structured or configured to execute or implement the instructions, commands, and/or control processes described herein with respect to the offset circuit 220, the gain circuit 222, the compensation circuit 224, the priority circuit 226, and the actuator circuit 228. The depicted configuration represents the offset circuit 220, the gain circuit 222, the compensation circuit 224, the priority circuit 226, and the actuator circuit 228 as machine or computer-readable media storing instructions. However, as mentioned above, this illustration is not meant to be limiting as the present disclosure contemplates other embodiments where the offset circuit 220, the gain circuit 222, the compensation circuit 224, the priority circuit 226, and the actuator circuit 228, or at least one circuit of the offset circuit 220, the gain circuit 222, the compensation circuit 224, the priority circuit 226, and the actuator circuit 228, is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the offset circuit 220, the gain circuit 222, the compensation circuit 224, the priority circuit 226, and the actuator circuit 228 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication).

The offset circuit 220 is structured or configured to receive raw data indicative of offset affecting the engine-out NOx sensor 127 and/or the system-out NOx sensor 128, transform the raw data, and output filtered offset values. This raw data indicative of offset affecting the engine-out NOx sensor 127 and/or the system-out NOx sensor 128 may be received based on one or more real or virtual sensors that estimate an amount of NOx at various points throughout the aftertreatment system 120 and set an amount of offset based on a comparison of the virtual sensor output to the actual sensor output (i.e., from the engine-out NOx sensor 127 and/or the system-out NOx sensor 128). These offset values may be either high or low. A high offset value indicates that the sensed NOx value is above the actual (i.e., estimated) NOx value, such that a positive offset value (i.e., >0) is to be subtracted from the sensed value. A low offset value indicates that the sensed NOx value is below the actual NOx value, such that a negative offset value (i.e., <0) is to be subtracted from the sensed value.

From there, the offset circuit 220 transforms this raw data into usable information, data, or values for addressing the NOx gap. In some embodiments, this transformation is accomplished via an Exponentially Weighted Moving Average (EWMA) filter that improves the usability of a raw dataset and distills an entire dataset down to a single value. The EWMA filter takes the average of a particular value (e.g., NOx offset) continuously over time (i.e., a moving average), and applies a weighting factor to the most recent values that decreases exponentially as values get less recent. In this way, the most recent values (e.g., values from the last x minutes or hours, or the last x values) receive exponentially more weight in the moving average calculation than less recent values (e.g., values from more than x minutes or hours ago, or values older than the last x values), smoothing the data set by reducing the impact of noise within the data and emphasizing the most recently-sampled datapoints.

Once the EWMA filter has been applied, a filtered offset value is output by the offset circuit 220. In some embodiments, the offset circuit 220 outputs a total of four filtered offset values: a filtered high offset value and a filtered low offset value for the engine-out NOx sensor 127, and a filtered high offset value and a filtered low offset value for the system-out NOx sensor 128. Although a sensor may only be experiencing either high offset or low offset at any instantaneous moment (i.e., the sensed value cannot be simultaneously higher and lower than the actual value), due to the EWMA filter sampling offset values over a period of time and the engine-out NOx sensor 127 and/or the system-out NOx sensor are likely to experience both high and low offset over a period of time, the offset circuit 220 outputs a filtered high offset value and a filtered low offset value for each sensor.

Figure 7:
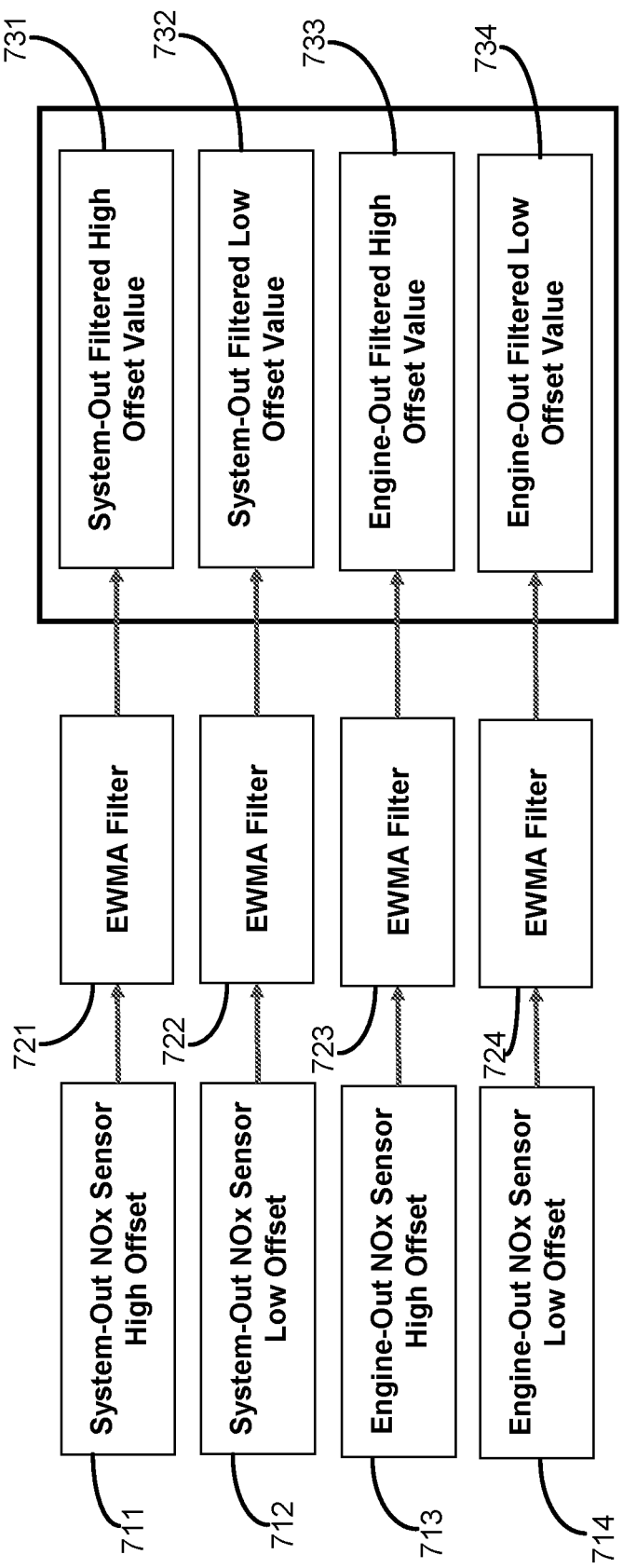
FIG. 7 is a flow diagram of a method for determining a filtered offset value affecting measurements or readings from an engine-out NOx sensor and a tailpipe NOx sensor, according to an exemplary embodiment.

FIG. 7 is a flow diagram of a method 700 for determining a filtered offset value affecting measurements or readings from an engine-out NOx sensor and a tailpipe NOx sensor, according to an exemplary embodiment. As shown in FIG. 7, method 700 begins at one of blocks 711-714. At 711, the controller 140 receives data indicative of an amount of high offset affecting the system-out NOx sensor 128. From there, the controller 140 applies a EWMA filter at 721, which outputs a filtered high offset value for the system-out NOx sensor 128 at 731. At 712, the controller 140 receives data indicative of an amount of low offset affecting the system-out NOx sensor 128. From there, the controller 140 applies a EWMA filter at 722, which outputs a filtered low offset value for the system-out NOx sensor 128 at 732. At 713, the controller 140 receives data indicative of amounts of high offset affecting the engine-out NOx sensor 127. From there, the controller 140 applies a EWMA filter at 723, which outputs a filtered high offset value for the engine-out NOx sensor 127 at 733. At 714, the controller 140 receives data indicative of amounts of low offset affecting the engine-out NOx sensor 127. From there, the controller 140 applies a EWMA filter at 724, which outputs a filtered low offset value for the engine-out NOx sensor 127 at 734.

The gain circuit 222 is structured or configured to receive raw data indicative of gain affecting the engine-out NOx sensor 127 and/or the system-out NOx sensor 128, transform the raw data, and output filtered gain values. This raw data indicative of gain affecting the engine-out NOx sensor 127 and/or the system-out NOx sensor 128 may be received based on one or more virtual or real sensors that estimate an amount of NOx at various points throughout the aftertreatment system 120 and set an amount of gain based on a comparison of the virtual sensor output to the actual sensor output (i.e., from the engine-out NOx sensor 127 and/or the system-out NOx sensor 128). These gain values may be either high or low. A high gain value indicates that the sensed NOx value is above the actual (i.e., estimated) NOx value, such that a positive gain value (i.e., >1) is to be divided into the sensed value. A low gain value indicates that the sensed NOx value is below the actual NOx value, such that a negative gain value (i.e., <1) is to be divided into the sensed value.

From there, the gain circuit 222 transforms this raw data into usable information, data, or values for addressing the NOx gap. In some embodiments, this transformation is accomplished via a Exponentially Weighted Moving Average (EWMA) filter that improves the usability of a raw dataset and distills an entire dataset down to a single value. The EWMA filter takes the average of a particular value (e.g., NOx gain) continuously over time (i.e., a moving average), and applies a weighting factor to the most recent values (e.g., values from the last x minutes or hours, or the last x values) that decreases exponentially as values get less recent (e.g., values from more than x minutes or hours ago, or values older than the last x values). In this way, the most recent values receive exponentially more weight in the moving average calculation than less recent values, smoothing the data set by reducing the impact of noise within the data and emphasizing the most recently-sampled datapoints.

Once the EWMA filter has been applied, a filtered gain value is output by the gain circuit 222. In some embodiments, the gain circuit 222 outputs a total of four filtered gain values: a filtered high gain value and a filtered low gain value for the engine-out NOx sensor 127, and a filtered high gain value and a filtered low gain value for the system-out NOx sensor 128. Although a sensor may only be experiencing either high gain or low gain at any instantaneous moment (i.e., the sensed value cannot be simultaneously higher and lower than the actual value), due to the EWMA filter sampling gain values over a period of time and the engine-out NOx sensor 127 and/or the system-out NOx sensor are likely to experience both high and low gain over a period of time, the gain circuit 222 outputs a filtered high gain value and a filtered low gain value for each sensor. The filtered high gain value is indicative of an amount of high gain affecting readings and measurements from the engine-out NOx sensor 127 and the system-out NOx sensor 128, such that the filtered high gain value is an estimate of an amount that the current readings and measurements overstate or overestimate an amount of NOx in the exhaust stream. The filtered low gain value is indicative of an amount of low gain affecting readings and measurements from the engine-out NOx sensor 127 and the system-out NOx sensor 128, such that the filtered low gain value is an estimate of an amount that the current readings and measurements understate or underestimate an amount of NOx in the exhaust stream. As such, both the filtered high gain value and the filtered low gain value provide an improved evaluation of how the engine-out NOx sensor 127 and the system-out NOx sensor 128 are inaccurately measuring the amount of NOx in the exhaust stream.

Figure 8:
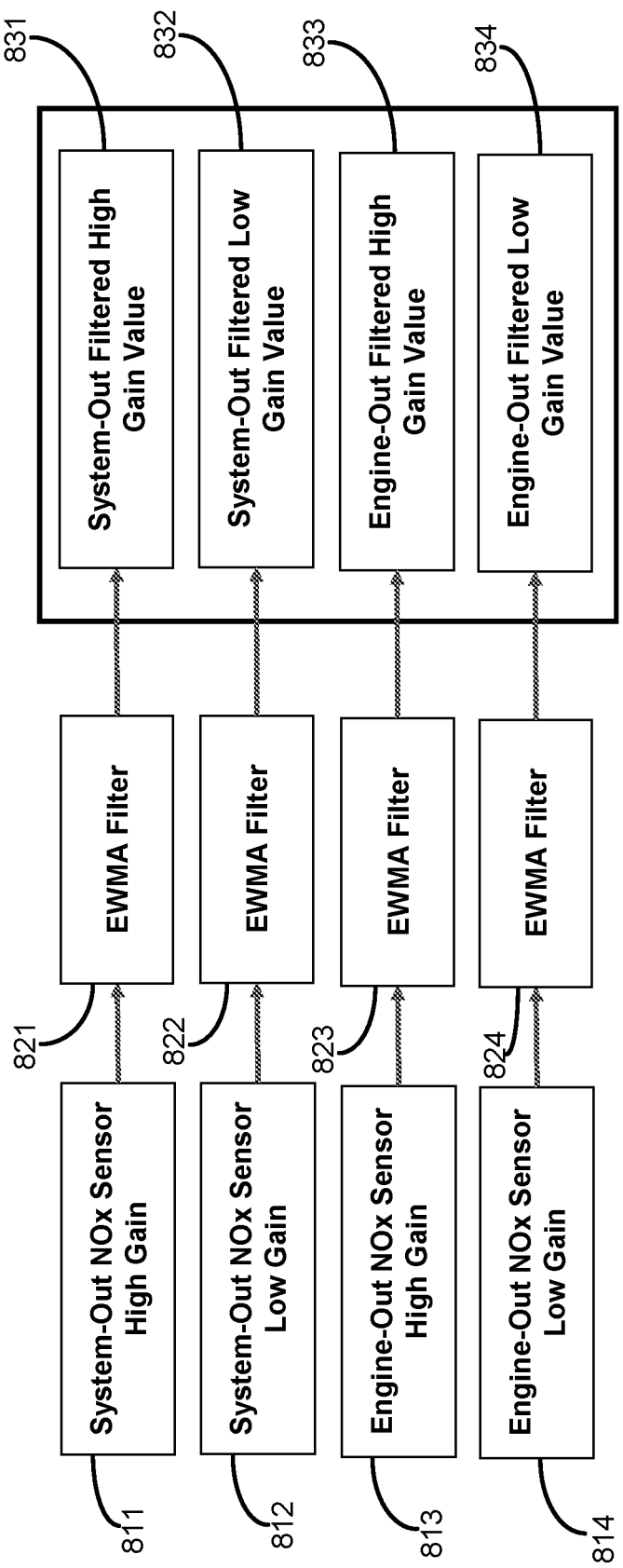
FIG. 8 is a flow diagram of a method for determining a filtered gain value affecting measurements or readings from an engine-out NOx sensor and a tailpipe NOx sensor, according to an exemplary embodiment.

FIG. 8 is a flow diagram of a method 800 for determining a filtered gain value affecting measurements or readings from an engine-out NOx sensor and a tailpipe NOx sensor, according to an exemplary embodiment. As shown in FIG. 8, method 800 begins at one of blocks 811-814. At 811, the controller 140 receives data indicative of amounts of high gain affecting the system-out NOx sensor 128 based on one or more virtual or real sensors that estimate an amount of NOx at various points throughout the aftertreatment system 120 and set an amount of gain based on a comparison of the virtual sensor output to the actual sensor output (i.e., from the engine-out NOx sensor 127 and/or the system-out NOx sensor 128). From there, the controller 140 applies a EWMA filter at 821, which outputs a filtered high gain value for the system-out NOx sensor 128 at 831. At 812, the controller 140 receives data indicative of amounts of low gain affecting the system-out NOx sensor 128. From there, the controller 140 applies a EWMA filter at 822, which outputs a filtered low gain value for the system-out NOx sensor 128 at 832. At 813, the controller 140 receives data indicative of amounts of high gain affecting the engine-out NOx sensor 127. From there, the controller 140 applies a EWMA filter at 823, which outputs a filtered high gain value for the engine-out NOx sensor 127 at 833. At 814, the controller 140 receives data indicative of amounts of low gain affecting the engine-out NOx sensor 127. From there, the controller 140 applies a EWMA filter at 824, which outputs a filtered low gain value for the engine-out NOx sensor 127 at 834.

The compensation circuit 224 is structured or configured to receive the outputs from the offset circuit 220 and the gain circuit 222 and transforms the filtered output into a compensation value. The compensation value refers to an amount that, when applied to the readings or measurements from either the engine-out NOx sensor 127 or system-out NOx sensor, reverses the changes in the readings or measurements due to offset and/or gain by 'compensating' the readings or measurements. The compensation circuit 224 operates separately for the engine-out NOx sensor 127 and the system-out NOx sensor 128. In some embodiments, the compensation circuit 224 is configured to determine different compensation values for different operations (e.g., diagnosing a health of the SCR 123, actuating the DEF doser 126, etc.). For example, the compensation circuit 224 may determine a first compensation value to apply to the system-out NOx sensor 128 for diagnosing the SCR 123, and determine a second compensation value to apply to the engine-out NOx sensor 127 to actuate the DEF doser 126.

The compensation circuit 224, in some embodiments, transforms the filtered outputs from the offset circuit 220 and gain circuit 222 by feeding the filtered outputs into a lookup table and associating the filtered outputs with a compensation value. This lookup table associates values for the filtered gain/offset with a compensation value that is less than the value of the filtered gain/offset in order to avoid over-compensating. For example, if the filtered offset value is −15 ppm, the lookup table may associate that filtered offset value with a compensation value of −12 ppm. In another example, if the filtered gain value is 1.35, the lookup table may associate that filtered gain value with a compensation value of 1.27.

Once the compensation circuit 224 has transformed the filtered outputs into compensation values, the compensation circuit 224 applies the compensation values to the sensed output of the NOx sensors. For offset-based compensation, the compensation circuit 224 subtracts the compensation values associated with the filtered high offset value and filtered low offset value from the sensed NOx value (for either the engine-out NOx sensor 127 or the system-out NOx sensor 128). For gain-based compensation, the compensation circuit 224 divides the compensation values associated with the filtered high gain value and filtered low gain value into the sensed NOx value (for either the engine-out NOx sensor 127 or the system-out NOx sensor 128). These applied compensation values (i.e., offset-based applied compensation value for the engine-out NOx sensor 127, gain-based applied compensation value for the engine-out NOx sensor 127, offset-based applied compensation value for the system-out NOx sensor 128, and gain-based applied compensation value 128) are then fed into the priority circuit 226.

As discussed, the compensation circuit 224, in some embodiments, determines different compensation values depending on the application. These different compensation values stem from the use of different look-up tables, such that the compensation circuit 226 utilizes a first look-up table for SCR-diagnosis applications and a second look-up table for DEF doser 126 commands. For example, when being used in SCR-diagnosis applications, there is a greater concern for overcompensation due to the costs associated with over-frequent maintenance, so the look-up table associates compensation values with filtered gain/offset values more conservatively (i.e., lower compensation values than the filtered gain/offset values). However, when being used in tuning DEF doser 126 operation, the cost of overcompensation is less, as overcompensation would only lead to errors in DEF dosing, which can be mitigated (e.g., AMOX 124, regeneration events, etc.). As such, the second look-up table for DEF dosing associates compensation values with filtered gain/offset values that are much closer to the filtered values.

Figure 9:
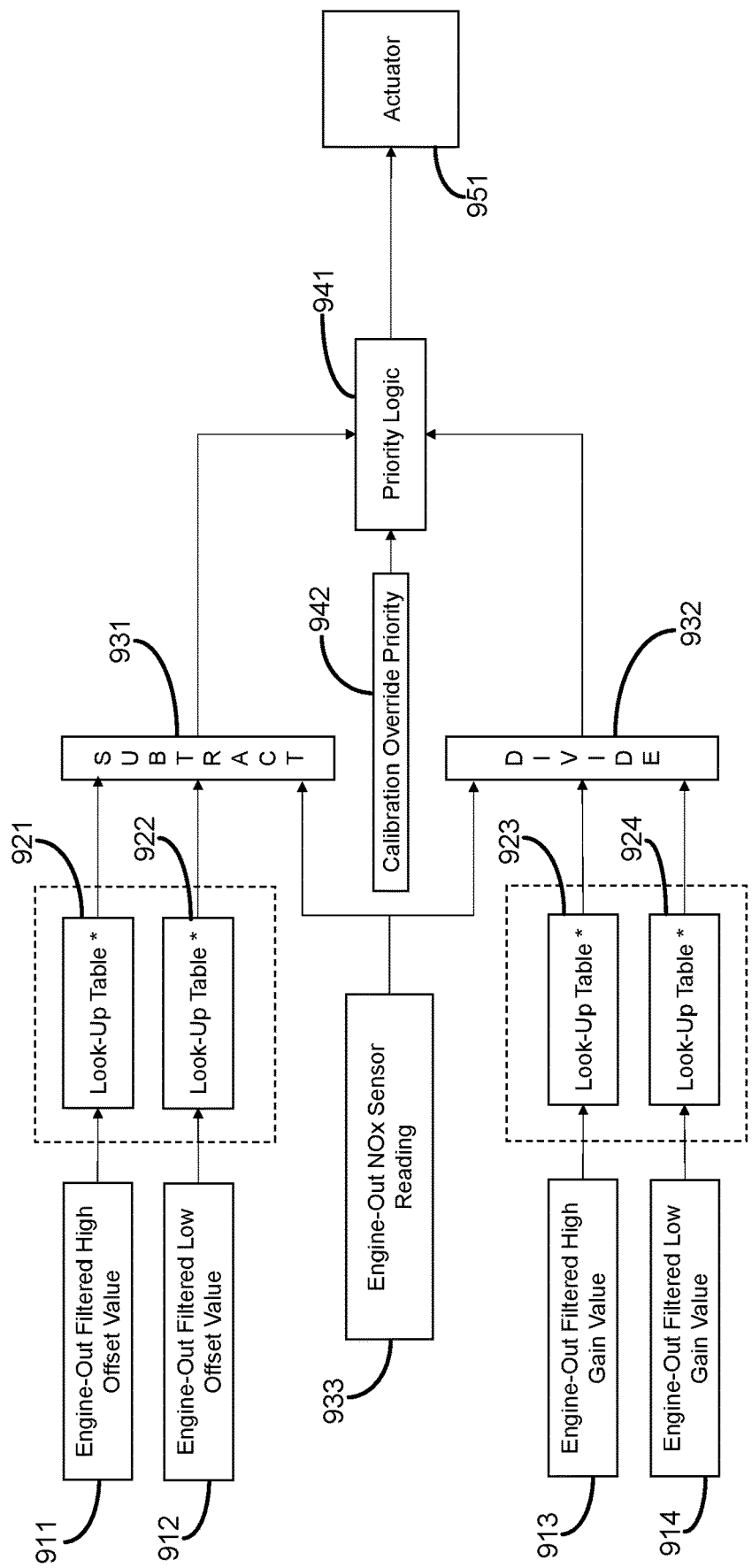
FIG. 9 is a flow diagram of a method for determining an amount of compensation for an engine-out NOx sensor reading or measurement, according to an exemplary embodiment.

FIG. 9 is a flow diagram of a method 900 for determining an amount of compensation for the engine-out NOx sensor 127, according to an exemplary embodiment. The method 900 begins at one of blocks 911-914. At 911, the controller 140 receives the engine-out filtered high offset value (from process 733) and associates the offset value with a compensation value from a look-up table at 921. At 912, the controller 140 receives the engine-out filtered low offset value (from process 734) and associates the offset value with a compensation value from a look-up table at 922. The values from 921 and 922 are then subtracted from the sensed output from the engine-out NOx sensor 128 from 933 at 931. At 913, the controller 140 receives the engine-out filtered high gain value (i.e., from 833) and associates the gain value with a compensation value from a look-up table at 923. At 914, the controller 140 receives the engine-out filtered low gain value (i.e., from 834) and associates the gain value with a compensation value from a look-up table at 924. The values from 923 and 924 are then divided into the sensed output from the engine-out NOx sensor 128 from 933 at 932. The resultant values from 931 and 932 are fed into priority logic (i.e., the priority circuit 226) at block 941. The priority logic 941 may be informed by the calibration override priority from 942, which adjusts the priority logic based on intended application for the compensation (e.g., prioritizing offset-based compensation over gain-based compensation if vehicle 10 intended for low EONOx operation, etc.). The output from the priority logic at 941 is fed into an actuator at block 951, where the controller 140 takes one or more actions based on the output from the priority logic. These one or more actions include: a) applying a compensation value to the sensed output from at least one of the engine-out NOx sensor 127 and the system-out NOx sensor 128 to generate a compensated value of NOx; b) raising a fault code for at least one of the engine-out NOx sensor 127, the system-out NOx sensor, or the SCR 123; c) sending commands to the DEF doser 126 to initiate dosing or to adjust a dosing amount; d) sending commands to affect a post-injection fueling event for the engine 100 in order to alter exhaust gas temperature; and/or e) sending commands to engage or adjust the heater 125 output in order to alter exhaust gas temperature.

Figure 10:
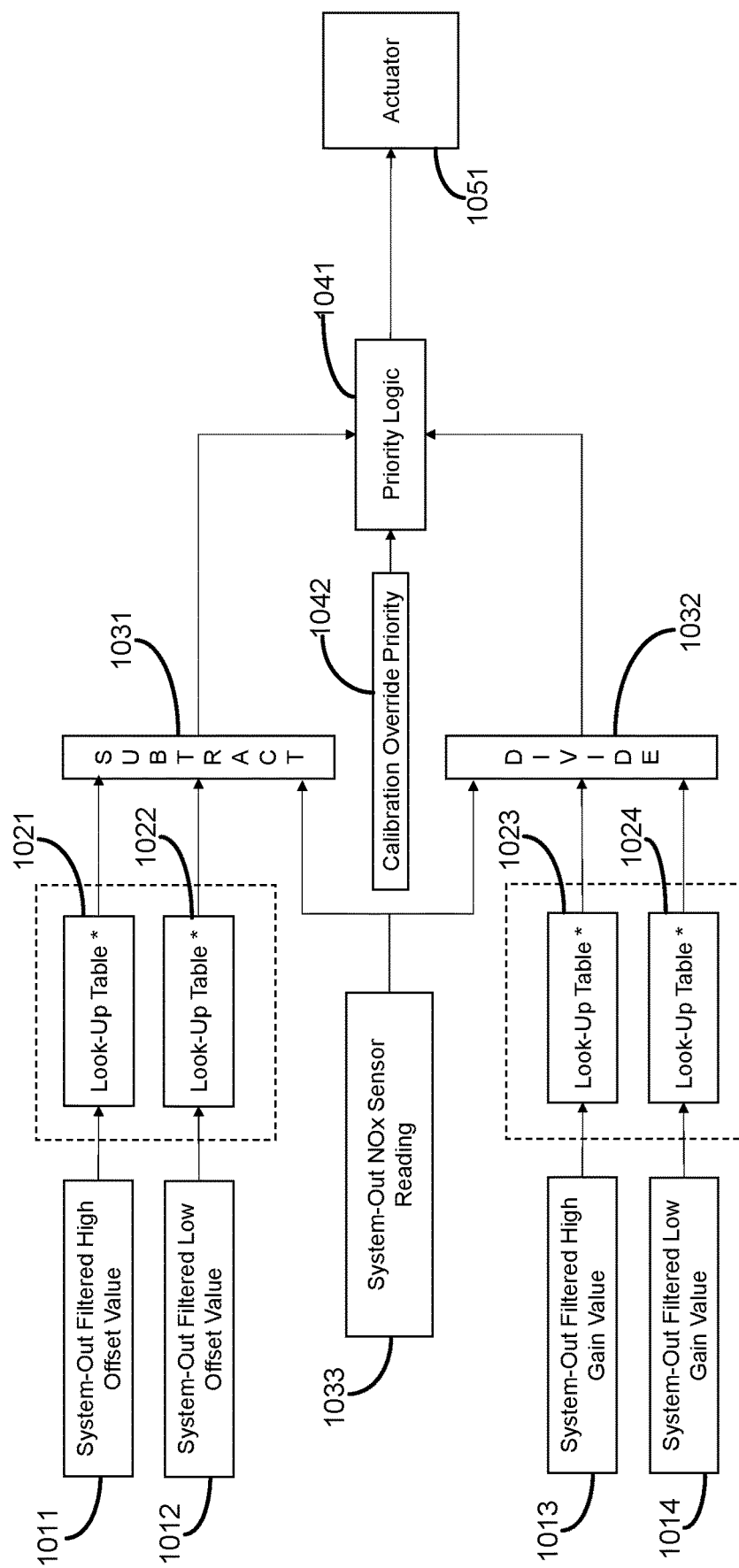
FIG. 10 is a flow diagram of a method for determining an amount of compensation for a system-out NOx sensor reading or measurement, according to an exemplary embodiment.

FIG. 10 is a flow diagram of a method 1000 for determining an amount of compensation for the system-out NOx sensor 128, according to an exemplary embodiment. The method 1000 begins at one of blocks 1011-1014. At 1011, the controller 140 receives the system-out filtered high offset value (from process 733) and associates the offset value with a compensation value from a look-up table at 1021. At 1014, the controller 140 receives the system-out filtered low offset value (from process 734) and associates the offset value with a compensation value from a look-up table at 1022. The values from 1021 and 1022 are then subtracted from the sensed output from the system-out NOx sensor 128 from 1033 at 1031. At 1013, the controller 140 receives the system-out filtered high gain value (from process 833) and associates the gain value with a compensation value from a look-up table at 1023. At 1014, the controller 140 receives the system-out filtered low gain value (from process 834) and associates the gain value with a compensation value from a look-up table at 1024. The values from 1023 and 1024 are then divided into the sensed output from the system-out NOx sensor 128 from 1033 at 1032 (i.e., the sensed output (A) is divided by both the filtered low gain value (B) and the filtered high gain value (C), such that the operation performed at 1032 can be given as A/B*C). The resultant values from 1031 and 1032 are fed into priority logic (i.e., the priority circuit 226) at block 1041. The priority logic 1041 may be informed by the calibration override priority from 1042, which adjusts the priority logic based on intended application for the compensation (e.g., prioritizing offset-based compensation over gain-based compensation if vehicle 10 intended for low EONOx operation, etc.). The output from the priority logic at 1041 is fed into an actuator at block 1051, where the controller 140 takes one or more actions based on the output from the priority logic. These one or more actions include: a) applying a compensation value to the sensed output from at least one of the engine-out NOx sensor 127 and the system-out NOx sensor 128 to generate a compensated value of NOx; b) raising a fault code for at least one of the engine-out NOx sensor 127, the system-out NOx sensor, or the SCR 123; c) sending commands to the DEF doser 126 to initiate dosing or to adjust a dosing amount; d) sending commands to affect a post-injection fueling event for the engine 100 in order to alter exhaust gas temperature; and/or e) sending commands to engage or adjust the heater 125 output in order to alter exhaust gas temperature.

The priority circuit 226 is structured or configured to receive the applied compensation values from the compensation circuit 224, and to determine which applied compensation value is most appropriate to guide the controller 140. In other words, the priority circuit 226 determines which of gain or offset value is having the greatest effect on the sensor output, and acts upon that determination to cause one or more action as described herein. For the engine-out NOx sensor 127, the priority circuit 226 receives the offset-based applied compensation value for the engine-out NOx sensor 127 and gain-based applied compensation value for the engine-out NOx sensor 127. If both applied compensation values are high based on both values exceeding a pre-defined threshold (e.g., offset>0, gain>1), the priority circuit 226 determines which of the gain or the offset is having a greater effect on the engine-out NOx sensor 127. In order to determine which is having a greater effect, the priority circuit 226 receives an estimated value for engine-out NOx from a virtual sensor, and applies the offset-based compensation (i.e., estimated NOx plus offset-based compensation value from the offset circuit 220) and applies the gain-based compensation (i.e., estimated NOx multiplied by gain-based compensation value from the gain circuit 222). If the applied-offset estimate is greater than the applied-gain estimate, then the priority circuit 226 determines that the offset is having a greater effect on the engine-out NOx sensor 127 and passes that determination on to the actuator circuit 228. Alternatively, if the applied-gain estimate is greater than the applied-offset estimate, then the priority circuit 226 determines that the gain is having a greater effect on the engine-out NOx sensor 127 and passes that determination on to the actuator circuit 228.

If both applied compensation values are low based on both values being below a pre-defined threshold (e.g., offset<0, gain<1), the priority circuit 226 determines which of the gain or the offset is having a greater effect on the engine-out NOx sensor 127. In order to determine which is having a greater effect, the priority circuit 226 receives an estimated value for engine-out NOx from a virtual sensor, and applies the offset-based compensation (i.e., estimated NOx plus offset-based compensation value from the offset circuit 220) and applies the gain-based compensation (i.e., estimated NOx multiplied by gain-based compensation value from the gain circuit 222). Then, if the applied-offset estimate is less (i.e., more negative) than the applied-gain estimate, then the priority circuit 226 determines that the offset is having a greater effect on the engine-out NOx sensor 127 and passes that determination on to the actuator circuit 228. Alternatively, if the applied-gain estimate is less (i.e. more negative) than the applied-offset estimate, then the priority circuit 226 determines that the gain is having a greater effect on the engine-out NOx sensor 127 and passes that determination on to the actuator circuit 228.

However, if both applied compensation values are not aligned (i.e., if one is low and one is high), the priority circuit 226 determines that no compensation is needed such that no compensation instruction is provided to the actuator circuit 228 for the engine-out NOx sensor 127. For example, if the gain is high (i.e., >1) but the offset is low (i.e., <0), that would indicate an issue with the underlying determination, as the priority circuit 226 is unable to make a decision on which effect is greater if the effects are in different directions. In this situation, the controller 140 takes no action and returns to the initial sampling steps for the offset circuit 220 and gain circuit 222.

A similar method is performed for the system-out NOx sensor 128. The priority circuit 226 receives the offset-based applied compensation value for the system-out NOx sensor 128 and gain-based applied compensation value for the system-out NOx sensor 128. If both applied compensation values are high (i.e., offset>0, gain>1), the priority circuit 226 determines which of the gain or the offset is having a greater effect on the system-out NOx sensor 128. In order to determine which is having a greater effect, the priority circuit 226 receives an estimated value for system-out NOx from a virtual sensor, and applies the offset-based compensation (i.e., estimated NOx plus offset-based compensation value from the offset circuit 220) and applies the gain-based compensation (i.e., estimated NOx multiplied by gain-based compensation value from the gain circuit 222). If the applied-offset estimate is greater than the applied-gain estimate, then the priority circuit 226 determines that the offset is having a greater effect on the system-out NOx sensor 128 and passes that determination on to the actuator circuit 228. Alternatively, if the applied-gain estimate is greater than the applied-offset estimate, then the priority circuit 226 determines that the gain is having a greater effect on the system-out NOx sensor 128 and passes that determination on to the actuator circuit 228.

If both applied compensation values are low (i.e., offset<0, gain<1), the priority circuit 226 determines which of the gain or the offset is having a greater effect on the system-out NOx sensor 128. In order to determine which is having a greater effect, the priority circuit 226 receives an estimated value for system-out NOx from a virtual sensor, and applies the offset-based compensation (i.e., estimated NOx value from the virtual sensor plus the offset-based compensation value from the offset circuit 220) and applies the gain-based compensation (i.e., estimated NOx value from the virtual sensor multiplied by gain-based compensation value from the gain circuit 222). Then, if the applied-offset estimate is less (i.e., more negative) than the applied-gain estimate, then the priority circuit 226 determines that the offset is having a greater effect on the system-out NOx sensor 128 and passes that determination on to the actuator circuit 228. Alternatively, if the applied-gain estimate is less (i.e. more negative) than the applied-offset estimate, then the priority circuit 226 determines that the gain is having a greater effect on the system-out NOx sensor 128 and passes that determination on to the actuator circuit 228.

However, if both applied compensation values are not aligned (i.e., if one is low and one is high), the priority circuit 226 determines that no compensation is to be passed along to the actuator circuit 228 for the system-out NOx sensor 128. For example, if the gain is high (i.e., >1) but the offset is low (i.e., <0), that would indicate an issue with the underlying determination, as the priority circuit 226 is unable to make a determination on which effect is greater if the effects are in different directions.

Similarly to the compensation circuit 224, the priority circuit 226 may alter its decision logic based on the application. For example, if the vehicle 10 is intended for use in compliance with stricter emission regulations (e.g., <0.02 or 0.05 g/bhp-hr NOx), the priority circuit 226 applies offset-based compensation rather than gain-based compensation, regardless of which applied estimate is greater (or lesser). Similarly, if the vehicle 10 is equipped for low EONOx (i.e., with a lean-burn engine), the priority circuit 226 applies offset-based compensation rather than gain-based compensation, regardless of the applied estimate comparison.

Figure 11:
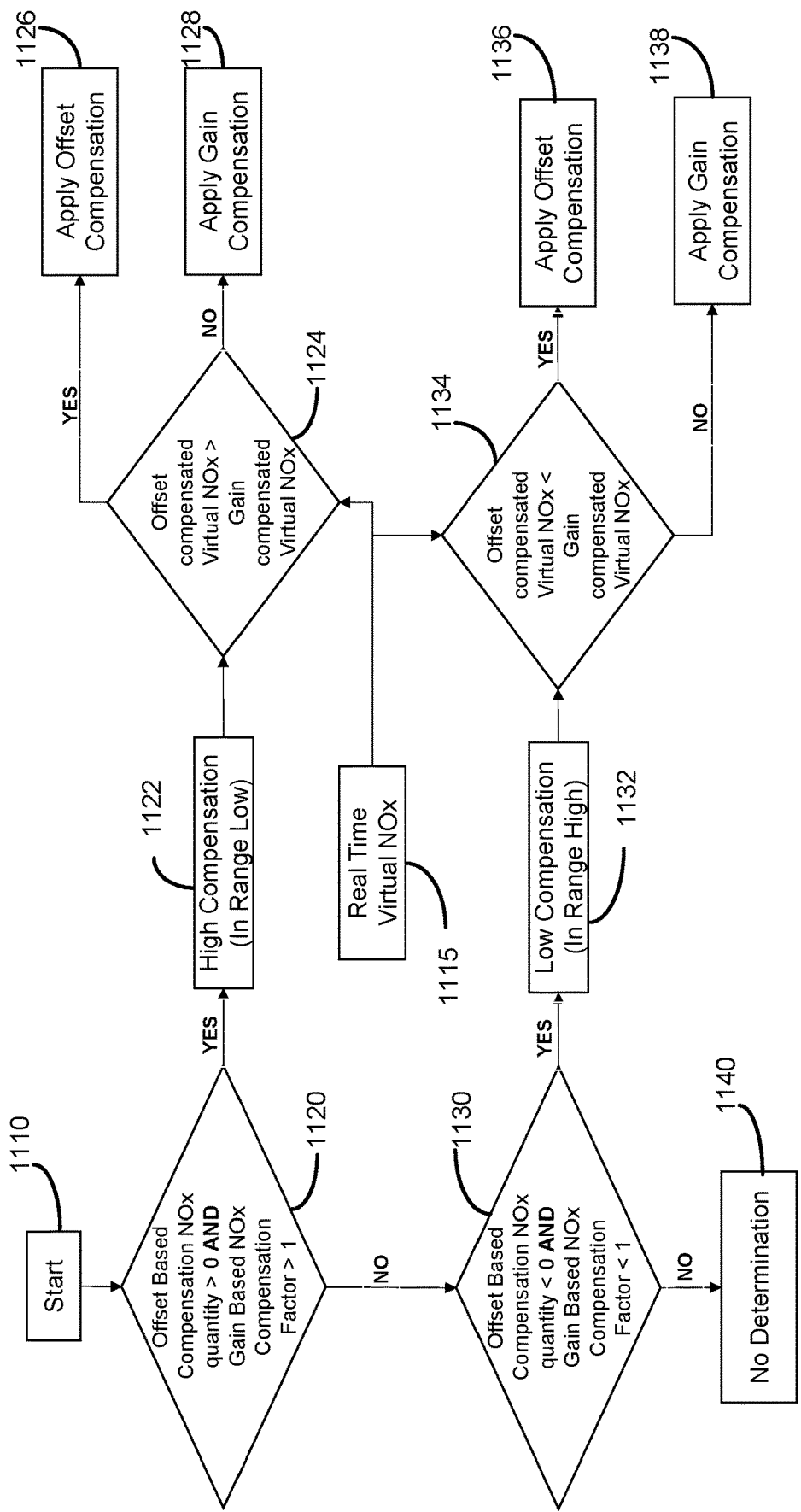
FIG. 11 is a flow diagram of a method for prioritizing gain compensation or offset compensation for sensor readings or measurements, according to an exemplary embodiment.

FIG. 11 is a flow diagram of a method 1100 for prioritizing gain compensation or offset compensation, according to an exemplary embodiment. As shown in FIG. 11, the method 1100 begins at block 1110, where the controller 140 receives the applied compensation values for offset (e.g., from 931 or 1031) and gain (e.g., from 932 or 1032). At 1120, the controller 140 determines if the offset-based compensation is greater than 0 (i.e., high offset) and if the gain-based compensation is greater than 1 (i.e., high gain). If not, the method 1100 proceeds to block 1130 (1120:NO). If yes, the method 1100 proceeds to block 1122 (1120:YES), where the controller 140 determines that the sensor at-issue (either the engine-out NOx sensor 117 or the system-out NOx sensor 118) is due for high compensation (i.e., the NOx sensor is in-range low). From there, the controller 140 applies each of the gain compensation and the offset compensation to an estimate of NOx from a virtual sensor from 1115 at 1124. If the offset-compensated estimate is greater than the gain-compensated estimate, the method 1100 proceeds to 1126 where the controller 140 determines to apply offset compensation (1124:YES). Alternatively, if the gain-compensated estimate is greater than the gain-compensated estimate, the method proceeds to 1128 where the controller 140 determines to apply gain compensation (1124:NO).

At 1130 (1120:NO), the controller 140 determines if the offset-based compensation is less than a predefined threshold indicating a low offset (e.g., 0) and if the gain-based compensation is less than a predefined threshold indicating a low gain (e.g., 1). If not, the method 1100 proceeds to block 1140 (1130:NO). If yes, the method 1100 proceeds to block 1132 (1130:YES), where the controller 140 determines that the sensor at-issue (either the engine-out NOx sensor 117 or the system-out NOx sensor 118) is due for low compensation (i.e., the NOx sensor is in-range high). From there, the controller 140 applies each of the gain compensation and the offset compensation to an estimate of NOx from a virtual sensor from 1115 at 1134. If the offset-compensated estimate is less (i.e., more negative) than the gain-compensated estimate, the method 1100 proceeds to 1136 where the controller 140 determines to apply offset compensation (1134:YES). Alternatively, if the gain-compensated estimate is less (i.e., more negative) than the gain-compensated estimate, the method proceeds to 1138 where the controller 140 determines to apply gain compensation (1134:NO). If the method 1100 proceeds to block 1140, the controller 140 determines that no compensation is to be applied, as there is a contradiction between one of gain or offset being high and the other of offset or gain being low.

The actuator circuit 228 is structured or configured to receive the determination from the priority circuit 226 and to take one or more actions based on the determination. These actions include a) applying a compensation value to the sensed output from at least one of the engine-out NOx sensor 127 and the system-out NOx sensor 128 to generate a compensated value of NOx; b) raising a fault code for at least one of the engine-out NOx sensor 127, the system-out NOx sensor, or the SCR 123; c) sending commands to the DEF doser 126 to initiate dosing or to adjust a dosing amount; d) sending commands to affect a post-injection fueling event for the engine 100 in order to alter exhaust gas temperature; and/or e) sending commands to engage or adjust the heater 125 output in order to alter exhaust gas temperature.

For example, when the actuator circuit 228 applies compensation to the engine-out NOx sensor 127 based on high offset or high gain, such that the sensed NOx value is less after the compensation value is applied, the actuator circuit 228 commands less dosing from the DEF doser 126 due to the lower NOx value, which reduces overall DEF consumption. When the actuator circuit 228 applies compensation to the engine-out NOx sensor 127 based on low offset or low gain, such that the sensed NOx value is more after the compensation value is applied, the actuator circuit 228 commands less dosing from the DEF doser 126, reducing overall DEF consumption. When the actuator circuit 228 applies compensation to the system-out NOx sensor 128 based on high offset or high gain, such that the sensed NOx value is less after the compensation value is applied, the actuator circuit 228 commands less dosing from the DEF doser 126, reducing overall DEF consumption.

Furthermore, by applying a compensation value to the sensed output from at least one of the engine-out NOx sensor 127 or the system-out NOx sensor 128, the actuator circuit 228 reduces the possibility that a malfunctioning SCR 123 will go undetected due to NOx sensor offset (or gain) by compensating for the offset (or gain) to enable the engine-out NOx sensor 127 and system-out NOx sensor 128 to operate with essentially non-material offset/gain (or with an acceptable amount of offset/gain). From there, the compensated data provide a more accurate determination of SCR conversion inefficiency (i.e., SONOx/EONOx), such that the controller 140 is able to address instances of type II errors when detecting SRC 123 malfunctions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 6, it should be understood that the controller 140 may include any number of circuits for completing the functions described herein. For example, the activities and functionalities of the offset circuit 220, the gain circuit 222, the compensation circuit 224, the priority circuit 226, and the actuator circuit 228 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 6. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A system for diagnosing an exhaust aftertreatment system and mitigating the effects of a potential fault in the exhaust aftertreatment system, the system comprising:
a sensor structured to provide exhaust gas constituent information; and
one or more processing circuits comprising one or more memory devices coupled to one or more processors, the one or more memory devices configured to store instructions thereon that, when executed by the one or more processors, cause the one or more processors to:

receive information indicative of an amount of a gain and an offset affecting the sensor;

determine a compensation gain value and a compensation offset value based on the amount of the gain and the offset;

receive the exhaust gas constituent information from the sensor;

apply the compensation gain value to the exhaust gas constituent information to create compensated information when the compensation gain value is greater than a first threshold, the compensation offset value is greater than a second threshold, and the compensation gain value is greater than the compensation offset value; and initiate an action based on the compensated information.

2. The system of claim 1, wherein the sensor is a NOx sensor.

3. The system of claim 2, wherein the NOx sensor is an engine-out NOx sensor or a system-out NOx sensor.

4. The system of claim 1, wherein the one or more memory devices are further configured to store instructions thereon that, when executed by the one or more processors, cause the one or more processors to:

determine a conversion inefficiency of a selective catalytic reduction (SCR) system based on the compensated information; and trigger a fault indicator regarding the SCR system responsive to determining that the conversion inefficiency of the SCR system exceeds a threshold.

5. The system of claim 1, wherein the one or more memory devices are further configured to store instructions thereon that, when executed by the one or more processors, cause the one or more processors to:

determine a conversion inefficiency of a selective catalytic reduction (SCR) system based on the compensated information; and command a reductant doser of the SCR system to increase at least one of a dosing frequency or a dosing quantity responsive to determining that the conversion inefficiency of the SCR system exceeds a threshold.

6. The system of claim 1, wherein the one or more memory devices are further configured to store instructions thereon that, when executed by the one or more processors, cause the one or more processors to:

apply the compensation offset value to the exhaust gas constituent information to create the compensated information when the compensation gain value is greater than the first threshold, the compensation offset value is greater than the second threshold, and the compensation offset value is greater than the compensation gain value.

7. The system of claim 1, wherein the one or more memory devices are further configured to store instructions thereon that, when executed by the one or more processors, cause the one or more processors to:

apply the compensation gain value to the exhaust gas constituent information to create the compensated information when the compensation gain value is less than the first threshold, the compensation offset value is less than the second threshold, and the compensation gain value is less than the compensation offset value; and apply the compensation offset value to the exhaust gas constituent information to create the compensated information when the compensation gain value is less than the first threshold, the compensation offset value is less than the second threshold, and the compensation offset value is less than the compensation gain value.

8. The system of claim 1, wherein the gain includes a high gain and a low gain, and wherein the one or more memory devices are further configured to store instructions thereon that, when executed by the one or more processors, cause the one or more processors to:

determine the high gain using an exponentially weighted moving average filter; and determine the low gain using an exponentially weighted moving average filter.

9. The system of claim 8, wherein the one or more memory devices are further configured to store instructions thereon that, when executed by the one or more processors, cause the one or more processors to:

query a dataset using at least one of the low gain or the high gain; and determine the compensation value based on information returned from the dataset.

10. The system of claim 1, wherein the offset includes a high offset and a low offset, and wherein the one or more memory devices are further configured to store instructions thereon that, when executed by the one or more processors, cause the one or more processors to:

determine the high offset using an exponentially weighted moving average filter; and determine the low offset using an exponentially weighted moving average filter.

11. A method for diagnosing an exhaust aftertreatment system and mitigating the effects of a potential fault in the exhaust aftertreatment system, the method comprising:

receiving, by a controller, data indicative of an amount of a gain and an offset affecting a sensor in an aftertreatment system;

determining, by the controller, a compensation gain value and a compensation offset value based on the amount of the gain and the offset;

receiving, by the controller, data indicative of an amount of an exhaust gas constituent in the aftertreatment system;

applying, by the controller, the compensation gain value to the data indicative of the amount of the exhaust gas constituent in the aftertreatment system to create compensated data when the compensation gain value is greater than a first threshold, the compensation offset value is greater than a second threshold, and the compensation gain value is greater than the compensation offset value; and initiating, by the controller, an action based on the compensated data.

12. The method of claim 11, wherein the sensor is a NOx sensor.

13. The method of claim 12, wherein the NOx sensor is an engine-out NOx sensor or a system-out NOx sensor.

14. The method of claim 11, wherein initiating the action further comprises:

determining, by the controller, a conversion inefficiency of a Selective Catalytic Reduction (SCR) system of the aftertreatment system based on the compensated data; and responsive to determining that the conversion inefficiency of the SCR system exceeds a threshold, providing, by the controller, a fault indicator regarding the SCR system.

15. The method of claim 11, wherein initiating the action further comprises:
  determining, by the controller, a conversion inefficiency of a Selective Catalytic Reduction (SCR) system of the aftertreatment system based on the compensated data; and
  responsive to determining that the conversion inefficiency of the SCR system exceeds a threshold, commanding, by the controller, a reductant doser of the aftertreatment system to increase at least one of a dosing frequency or a dosing quantity.

16. The method of claim 11, further comprising:
  applying, by the controller, the compensation offset value to the data indicative of the amount of NOx in the aftertreatment system to create the compensated data when the compensation gain value is greater than the first threshold, the compensation offset value is greater than the second threshold, and the compensation offset value is greater than the compensation gain value.

17. The method of claim 11, further comprising:
  applying, by the controller, the compensation gain value to data indicative of an amount of an exhaust gas constituent in the aftertreatment system to create the compensated data when the compensation gain value is less than the first threshold, the compensation offset value is less than the second threshold, and the compensation gain value is less than the compensation offset value; and
  applying, by the controller, the compensation offset value to the data indicative of the amount of NOx in the aftertreatment system to create the compensated data when the compensation gain value is less than the first threshold, the compensation offset value is less than the second threshold, and the compensation offset value is less than the compensation gain value.

18. A system for diagnosing an exhaust aftertreatment system and mitigating the effects of a potential fault in the exhaust aftertreatment system, the system comprising:
  a selective catalytic reduction (SCR) system;
  a sensor structured to provide exhaust gas constituent information regarding exhaust gas; and
  a controller configured to:
    receive the exhaust gas constituent information from the sensor;
    determine a compensation gain value and a compensation offset value;
    apply the compensation offset value to the exhaust gas constituent information to create compensated information when the compensation gain value is greater than a first threshold, the compensation offset value is greater than a second threshold, and the compensation offset value is greater than the compensation gain value; and
    initiate an action based on the compensated information.

19. The system of claim 18, wherein the controller is further configured to:
  determine a conversion inefficiency of the SCR system based on the compensated information; and
  command a reductant doser of the SCR system to increase at least one of a dosing frequency or a dosing quantity responsive to determining that the conversion inefficiency of the SCR system exceeds a threshold.

20. The system of claim 18, wherein the controller is further configured to:
  apply the compensation offset value to the exhaust gas constituent information to create the compensated information when the compensation gain value is less than the first threshold, the compensation offset value is less than the second threshold and the compensation offset value is less than the compensation gain value;
  apply the compensation gain value to the exhaust gas constituent information to create the compensated information when the compensation gain value is greater than the first threshold, the compensation offset value is greater than the second threshold and the compensation gain value is greater than the compensation offset value; and
  apply the compensation gain value to the exhaust gas constituent information to create the compensated information when the compensation gain value is less than the first threshold, the compensation offset value is less than the second threshold and the compensation gain value is less than the compensation offset value.

* * * * *